US010455077B2

(12) United States Patent
Greenberger et al.

(10) Patent No.: US 10,455,077 B2
(45) Date of Patent: Oct. 22, 2019

(54) CONTEXTUALLY CONFIGURING CONSISTENT PROXIMITY BEACON IDENTIFIERS

(71) Applicant: International Business Machines Corporation, Armonk, NY (US)

(72) Inventors: Jeremy A. Greenberger, Durham, NC (US); Jana H. Jenkins, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/086,650

(22) Filed: Mar. 31, 2016

(65) Prior Publication Data

US 2017/0289344 A1    Oct. 5, 2017

(51) Int. Cl.
| H04M 1/725 | (2006.01) |
| G01S 1/04 | (2006.01) |
| G01S 5/02 | (2010.01) |
| H04W 4/04 | (2009.01) |
| G01S 1/68 | (2006.01) |
| G01S 5/14 | (2006.01) |

(52) U.S. Cl.
CPC ......... H04M 1/72572 (2013.01); G01S 1/042 (2013.01); G01S 5/0242 (2013.01); H04W 4/04 (2013.01); G01S 1/68 (2013.01); G01S 5/14 (2013.01); H04M 2250/02 (2013.01)

(58) Field of Classification Search
CPC ......... G01S 1/68; G01S 1/042; G01S 5/0242; G01S 5/14; H04M 1/72572; H04M 2250/02; H04W 4/04
See application file for complete search history.

(56) References Cited

U.S. PATENT DOCUMENTS

| 8,866,673 | B2 | 10/2014 | Mendelson |
| 9,037,160 | B2 | 5/2015 | Jones et al. |
| 9,202,245 | B2 | 12/2015 | Kostka et al. |
| 2015/0094080 | A1 | 4/2015 | Bleecher Snyder |
| 2015/0140982 | A1* | 5/2015 | Postrel .................. H04W 4/008 455/418 |
| 2015/0177006 | A1 | 6/2015 | Schulz et al. |
| 2015/0281878 | A1 | 10/2015 | Roundtree et al. |
| 2015/0289088 | A1 | 10/2015 | Terrazas |
| 2015/0289295 | A1 | 10/2015 | Granbery |

(Continued)

OTHER PUBLICATIONS

Ji et al.; "Analysis of Positioning Accuracy Corresponding to the Number of BLE Beacons in Indoor Positioning System" 17th IEEE Inter. Conf. On, Jul. 1-3, 2015, pp. 92-95.

(Continued)

*Primary Examiner* — Dinh Nguyen

(74) *Attorney, Agent, or Firm* — Robert H. Frantz; Maeve M. Carpenter

(57) ABSTRACT

Administration and consistency of proximity beacon naming within one or more venues is improved by use of a mobile device to discover ranges of the beacons, and upon discovery, determining a location of a mobile computing device within the venue; receiving at the location by the mobile computing device one or more identifiers from one or more proximity beacons within range of the location; and updating by the mobile device at least one of the one or more identifiers according to a proximity beacon naming policy.

12 Claims, 6 Drawing Sheets

(56) References Cited

U.S. PATENT DOCUMENTS

| | | | | |
|---|---|---|---|---|
| 2015/0334548 | A1* | 11/2015 | Liu | H04W 4/80 370/329 |
| 2015/0348146 | A1 | 12/2015 | Shanmugam et al. | |
| 2015/0364017 | A1* | 12/2015 | Hall | G06Q 10/06315 340/539.13 |
| 2015/0365582 | A1 | 12/2015 | Eramian | |
| 2016/0007184 | A1* | 1/2016 | Kulikov | G01S 5/0252 455/41.2 |
| 2016/0012515 | A1 | 1/2016 | Cronin et al. | |
| 2016/0014609 | A1 | 1/2016 | Goel et al. | |
| 2016/0044467 | A1* | 2/2016 | Clausen | H04W 4/04 455/457 |
| 2016/0086029 | A1* | 3/2016 | Dubuque | G06K 9/00536 382/159 |
| 2016/0128049 | A1* | 5/2016 | Phillips-Lubimiv | H04L 67/303 370/329 |
| 2016/0210605 | A1* | 7/2016 | Vaish | G06Q 20/12 |
| 2017/0064497 | A1* | 3/2017 | Thomas | H04W 4/02 |
| 2017/0124592 | A1* | 5/2017 | Naya | G06Q 30/0261 |

OTHER PUBLICATIONS

Bobek et al.; "Indoor Microlocation With BLE Beacons and Incremental Rule Learning", CYBCONF, 2nd IEEE International Conference on, Jun. 24-26, 2015, pp. 91-96.

Estimote Community; "How to modify UUID, Major, and Minor values?", retrieved on Feb. 2, 2016 from https://community.estimote.com/hc/en-us/articles/.

Aislelabs; "The Hitchhikers Guide to iBeacon Hardware: A Comprehensive Report by Aislelabs (2015)", retrieved on Mar. 13, 2016 from http://www.aislelabs.com/reports/.

IBM; "Presence Insights: Customer insights everywhere"; retrieved on Feb. 2, 2016 by Retreived on Feb. 2, 2016 from http://www-01.ibm.com/common.

IBM; "From transactions to relationships: Connecting with a transitioning shopper"; retreived on Feb. 2, 2016 from http://www-01.ibm.com/common.

Twocanoes Blog; "Rise of the iBeacon", retrieved on Feb. 2, 2016 from http://blog.twocanoes.com/post/61728306777.

\* cited by examiner

CONTEXTUALLY CONFIGURING CONSISTENT PROXIMITY BEACON IDENTIFIERS

BACKGROUND

This invention relates generally to methods to configuring identifier values for proximity beacons to be consistent within a physical local context, and optionally, to be consistent within a enterprise-wide physical and/or geographical context.

Proximity beacons including Bluetooth Low-Energy (BLE) beacons which are small, often hidden from view, electronic devices that emit wireless signals within a short range in compliance with the Bluetooth wireless public specifications. For example, the minimum range of transmission and reception from a BLE beacon may be set to as small as 1 meter (−30 dBm configuration) to as wide as 50 meters (0 dBm configuration) for devices complying with the transmission power and reception signal capture specifications. Other wireless proximity beacons may utilize other signal formats and protocols, and as such, may have different effective ranges. Proximity beacons come in a wide variety of shapes and sizes, many of which run on a single battery for an extended period of time, and some of which actual harvest ambient light to recharge their batteries, thereby offering very long service-free operational lives.

Many uses are envisioned for proximity beacons. Initially, they were intended to solve the problem that satellite signals from Global Positioning Systems (GPS) were not reliably received inside structures (offices, hotels, shopping malls, hospitals, etc.), so navigation applications on mobile devices tended to be disabled when a user enters a structure. Proximity beacons are installed by structure owners and operators throughout their facilities to provide for short-range navigation within the structure. Application programs ("apps") running on mobile devices such as cellular phones, smart phones, tablet computers, netbooks, laptop computers, and body-worn technology (e.g., smart watches, smart pendants, smart glasses, etc.) use the mobile device's short range wireless transceiver (Bluetooth, near-field communication, Zigby, etc.) to detect when the mobile device has moved within range of one or more proximity beacons. This information can then be used by the app to provide a wide range of useful information and functions to the user, not the least of which is map navigation within the facility, reception of advertisements and commercial offers, and various safety and security functions such as location of the nearest exits, nearest elevators, and restrooms.

A key element of successful operation of proximity beacons in this context is for each beacon to have an identifier which is at least unique within the physical context (e.g. within the building, office, hospital, hotel, school, mall, etc.), if not globally unique. To aid in this uniqueness, most proximity beacons are manufactured and configured to have default unique identifiers which include variations of random values, manufacturer indicators, and serial numbers. In the present state of technology, these preset or default unique identifier values can be used directly in the application programs which wish to leverage the available proximity beacons in a structure.

SUMMARY OF THE INVENTION

Administration and consistency of proximity beacon naming within one or more venues is improved by use of a mobile device to discover ranges of the beacons, and upon discovery, determining a location of a mobile computing device within the venue; receiving at the location by the mobile computing device one or more identifiers from one or more proximity beacons within range of the location; and updating by the mobile device at least one of the one or more identifiers according to a proximity beacon naming policy. Other available benefits, features and functions are also provided in accordance with the following description of one or more exemplary embodiments.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

Figure 1:
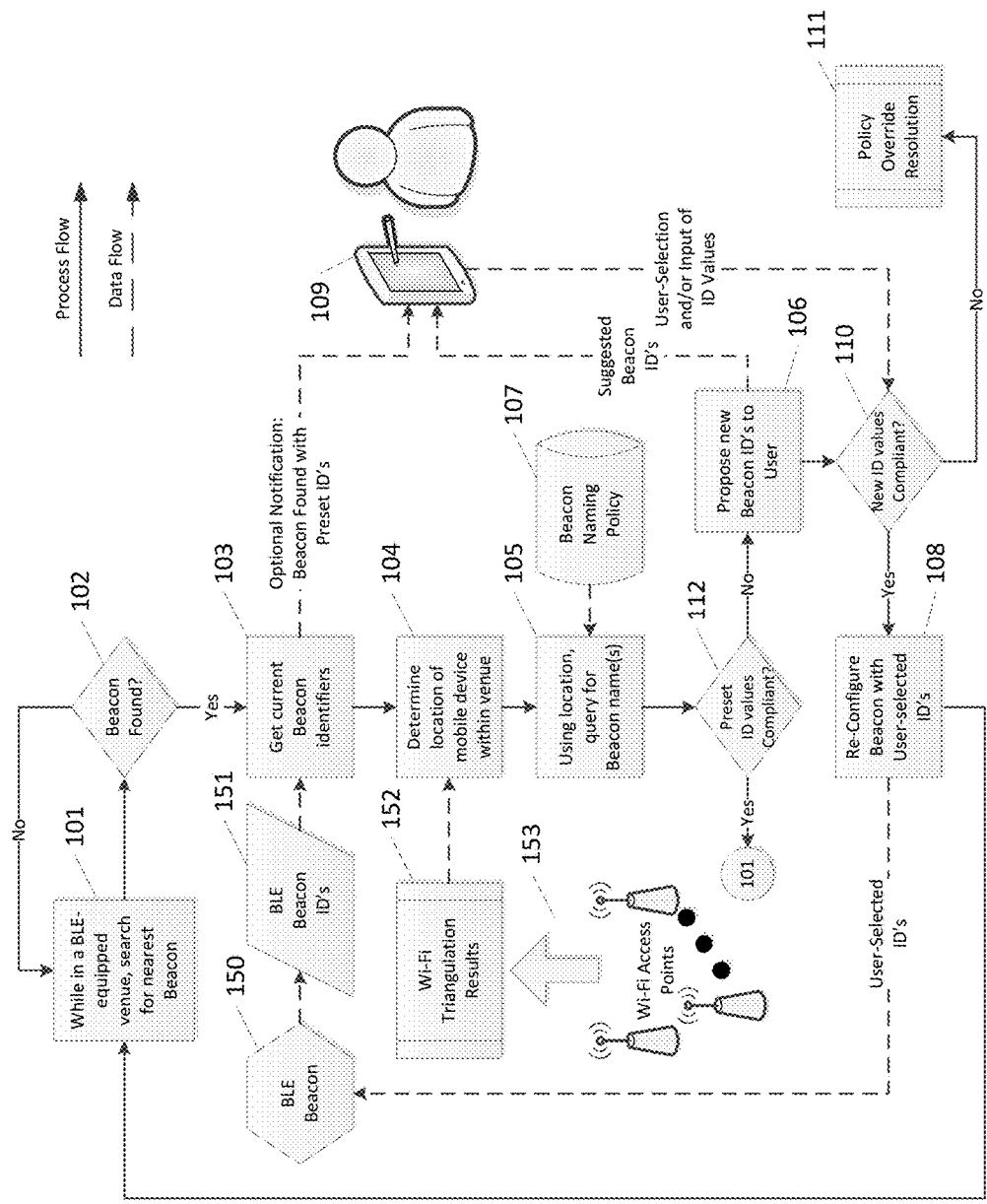
FIG. 1 illustrates a process embodiment according to the present invention.

The present inventors have recognized that it can be very difficult for organizations to manage an abundance of proximity beacons, especially Bluetooth (BLE) beacons, within a single physical structure or an enterprise of structures (e.g., hotel chain, mall chain, hospital chain, retail store chain, etc.). Proximity beacons are usually small and do not have any identifier visible to the naked eye. Venue operators may choose to name and identify each beacon differently, which can lead to disorganization and ineffective reporting of analytics. Having recognized this unsolved problem in the art, the present inventors have developed a solution which allows venue operators to name and organize their proximity beacons based on the context of their management system.

The following embodiments are provides as examples only, and do not represent the bounds of the invention. In the present disclosure, we will use BLE Beacons as an example of proximity beacons, and other embodiments of the invention may utilize, incorporate and interoperate with other types of proximity beacons without departure from the present invention. The proximity beacon's architecture, protocol and application interface may be compatible with one or more open and/or proprietary specifications. User client devices which may receive and transmit information from and to proximity beacons may be cell phones, smart phones, tablet computers, laptop computers, desktop computers, and body-worn smart devices, running open and/or proprietary operating systems, and providing user interface devices such as keyboards, displays, audio, touch-based input, and stylus-based input.

As such, the following example embodiments may refer to or illustrate particular options within these ranges of options, but the scope of the present invention is not limited to such devices, operating systems, application interfaces or protocols.

Example Proximity Beacon Operation

Each proximity beacon periodically transmits a universal identifier (UUID), such as, for example, a value DE305D54-75B4-431B-ABD2-EB6B9E546014. Many proximity beacons also transmit a major number, a minor number, and a transmission power value. The UUIDs are not guaranteed unique because they are not centrally administered or assigned, but they are believed to be sufficiently large such that they can be generated by each manufacturer with little chance of overlap or collision. Proximity beacon administrator user's may change the default UUID, major, minor and power level values using a configuration utility, typically provided by the beacon's manufacturer. For example, a proximity beacon administrator for a chain of 10 related retail stores (e.g., an retail store enterprise) may set the UUIDs to be 1 of 10 values based on the store (underlining emphasis added):

Store 1: DE305D54-75B-431B-ABD2-EB6B9E546<u>001</u>
Store 2: DE305D54-75B-431B-ABD2-EB6B9E546<u>002</u>
Store 3: DE305D54-75B-431B-ABD2-EB6B9E546<u>003</u>
. . .
Store 10: DE305D54-75B-431B-ABD2-EB6B9E546<u>004</u>.

So, for example, all proximity beacons in Store 8 would end in "08". However, the administrator may then set the major number and minor number according to his or her own plan. For example, the administrator might use the major number to represent the floor of the store (1=first floor, 2=second floor, B=basement, etc.), and might use the minor number to represent a geographical relative quadrant of the building (NW, SW, SE, NE). Or, another administrator may use the major number to represent departments within the store (shoes, housewares, women's clothes, etc.) and the minor number to represent endcap versus aisle location.

The possibilities are practically endless, which is where both the benefits and the problems arise. Because the apps running on the proximate user's mobile app must comprehend this identification coding scheme, whatever it may be, in order to provide useful functionality to the user, these variations in configuration may require a lot of lookup tables or remote server requests for translating the ID values to useful information.

System-Level Description

Embodiments of the present invention provide one or more of the following advantages over the existing technologies for configuring and managing the proximity beacon identifier values within a single-structure or enterprise of multiple structures:

Retail stores can easily configure the naming conventions for their beacons so that there is consistency throughout the retail chain.
Venue operators can more easily identify a beacon by using human-readable identifiers.
Retailers can build mobile applications using a software development kit (SDK) while reducing the risk of causing problems with unforeseen beacon names.
Businesses can increase efficiency of operation of their computing enterprise.
Analytics can become more accurate through incorporation of more meaningful information.

Embodiments of the present invention may be used in conjunction with several available enterprise solutions which provide intelligent, in-store, location-based services to allow customers share information about their shopping preferences, and to quickly incorporate location data from beacons and other Internet of Things sensors with enterprise and cloud data services and apply real time analytics. Such systems, among other features, aggregate customer location and location-related metadata to build contexts that can be used for analysis and resulting actions.

Figure 2:
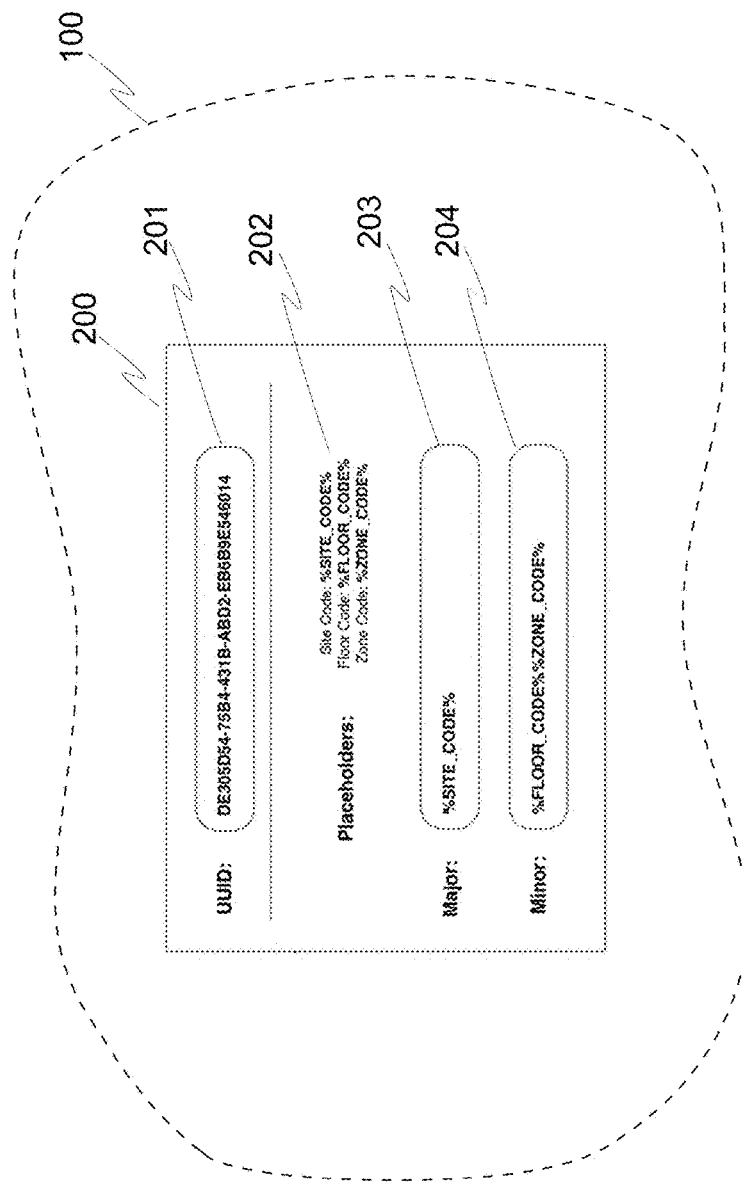
FIG. 2 shows a basic embodiment of an administrator user interface to view and change identifier values of a proximity beacon.

An example basic user interface (200) displayed on a portion (100) of a screen of a computer to an administrator is illustrated in FIG. 2, in which the UUID (201) is pre-populated with a value from an encountered proximity beacon, and placeholder values (202) for a site code, floor code and zone code are shown. Using such a basic user interface, the administrator could manually configure each beacon within a physical venue according to the desired beacon naming scheme. However, this can be time consuming, error prone, tedious, and leaves open a possibility for a wide variety of variations within a business enterprise.

An example basic user interface (200) displayed on a portion (100) of a screen of a computer to an administrator is illustrated in FIG. 2, in which the UUID is pre-populated with a value from an encountered proximity beacon, and placeholder values are shown. Using such a basic user interface, the administrator could manually configure each beacon within a physical venue according to the desired naming scheme. However, this can be time consuming, error prone, tedious, and leaves open a possibility for a wide variety of variations within a business enterprise.

Figure 3:
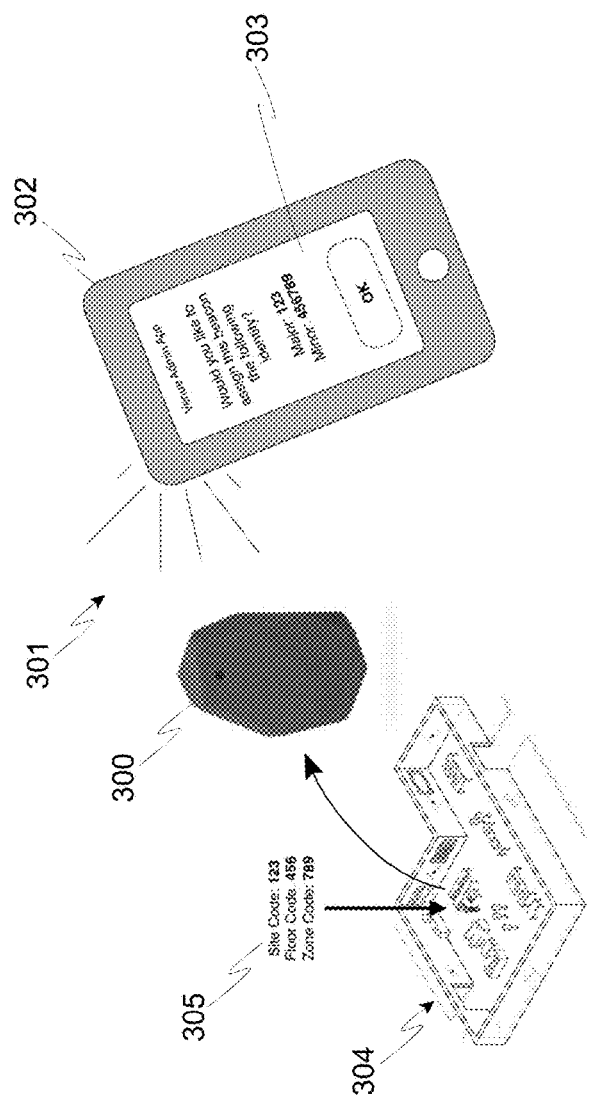
FIG. 3 depicts a described method of use of the present invention which illustrates at least one embodiment of the invention.

So, using an embodiment of the present invention, instead of pre-configuring proximity beacons for their intended locations and then physically distributing them to those spots, an administrator may first pre-position the proximity beacons in the venue. Then, as shown in FIG. 3, as the administrator (305) walks around the venue (304), as he or she encounters (comes into range of) each proximity beacon (300), the administrator's mobile device (302) communicates (301) wirelessly with the beacon (300) and provides certain administrator functions on the screen (303) and other user-interface devices (pointer, mouse, keyboard, trackball, trackpad, stylus, microphone, speaker, etc.). Upon encountering each beacon, the administrator then knows the actual boundary of the range of the beacon, and can observe the apparent zone within the floor, for example, and can make the appropriate changes to the beacon's identifier values.

Further, some embodiments of the invention will access a naming schema or policy to propose ID values at this point to enhance consistency and decrease the amount of time for the administrator to complete the fields on the user interface. More details of this feature of some embodiments will be discussed in the following paragraphs.

Further, some embodiments of the invention will record and associate a Wi-Fi triangulated position within the venue with the configured beacon ID values for use in the administration console or toolset. More details of this feature of some embodiments will be discussed in the following paragraphs.

Figure 4:
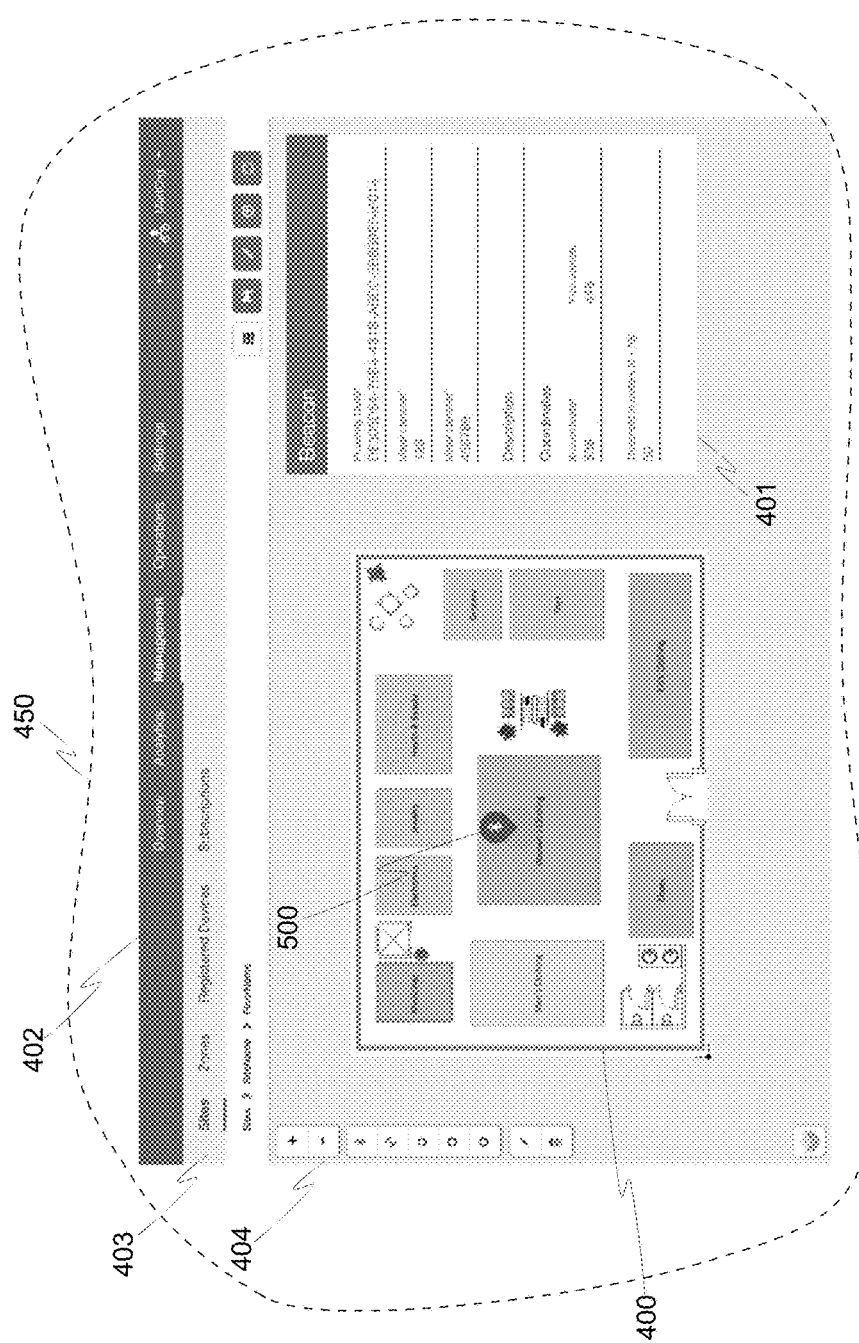
FIG. 4 sets forth an example administrator console enabled by the processes of the invention to manage and update proximity beacon identifiers.

Referring now to FIG. 4, an example administrator dialog (402) displayed on a portion (450) of a computer screen includes a map-like representation (400) of the layout of the venue and a beacon details (401) dialog which, for a selected beacon (500), lists the beacon's UUID, major value, minor value, triangulated coordinates within the venue, and a power threshold, plus an optional long description. Other tabs, drop down lists, and functions (402, 403, 404) may be provided for opening and saving venue files, seeing available ID values per the implemented naming scheme, and zooming the view in or out.

Figure 5:
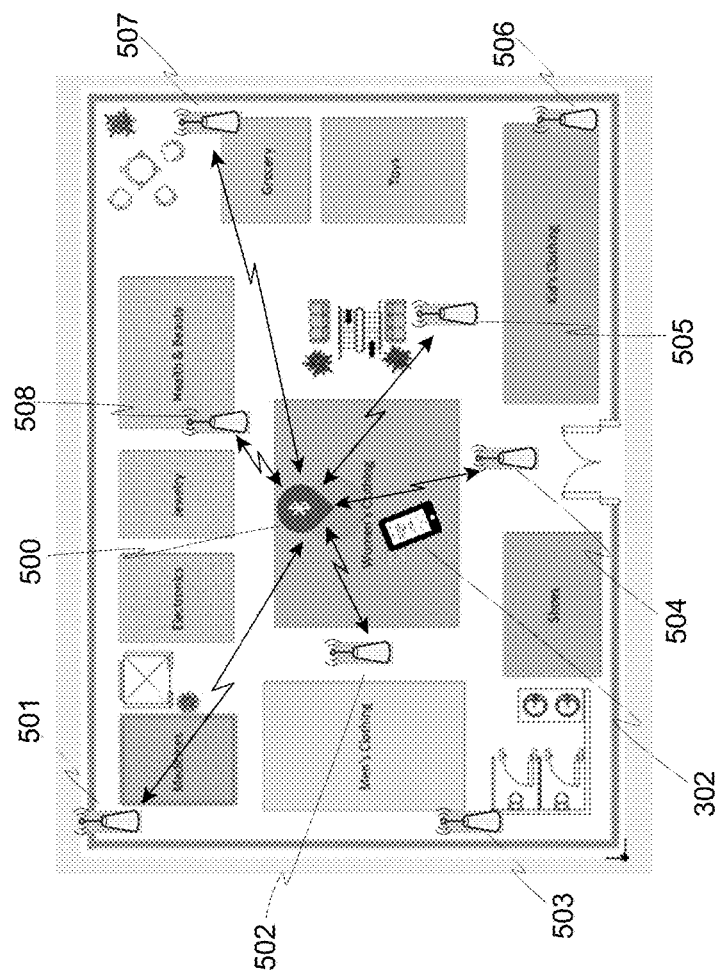
FIG. 5 shows an example of location determination using wi-fi triangulation.

Turning now to FIG. 5, more details of the Wi-Fi triangulation function of some embodiments are shown, in which a proximity beacon (500) is located in a women's clothing department (zone) of a hypothetical floor of a retail store. This department is surrounded by other departments: medicines, electronics, jewelry, health and beauty, grocery, toys, kid's clothing, shoes, restrooms, and men's clothing, as shown. A plurality of Wi-Fi access points (WAPs) (501-508) are positioned around the floor, with which the administrator's mobile device (302) can communicate. As the administrator moves the mobile device (302) into range of a particular beacon (500) and establishes contact with it, the mobile device also performs a triangulation process between three or more of the WAPs (501-508), such as a power-level triangulation or time-delay triangulation. Based on the known positions of the WAPs and the estimated position of the mobile device (302), the mobile device establishes a set of position coordinates (x-y) within the venue and associates them with the encountered beacon.

Now, the administrator can adjust the beacon's ID values according to the naming scheme, and using the optional suggested values according to a beacon naming policy and/or central administration server (more details in the following paragraphs).

This process is repeated by moving the mobile device (302) around the venue to encounter all of the beacons, estimate the ranges of each of them by triangulating to create coordinates, associating the coordinates with the beacon and revising the beacon's ID values.

Logical Process Example

Primary Embodiment. Referring now to FIG. 1, an example logical process according to the present invention is shown. As the administrator "walks the floor" (e.g., moves around the venue), the mobile device (109) searches for proximity beacons (101), such as BLE beacons. When a proximity beacon (150) is encountered (102), the current or pre-set identifiers (151) of the beacon are received (103) by the user's mobile device (109). Optionally, the user is notified of the found beacon's ID values.

Coordinates of the current location of the mobile device (109) within the venue are determined (104) such as by the results of Wi-Fi triangulation (152) from a plurality of Wi-Fi access points (153), or the coordinates accessed if they are being maintained in real time.

Based on these location coordinates (105), the mobile device then uses a beacon naming policy or remote service (107) to determine (112) if the preset ID values are compliant with the naming policy (107). If so, then the process continues looking for other beacons (101, 102). If not, then the process proposes (106) to the user via the mobile device (109) one or more suggested beacon ID values (e.g., UUID, major value, minor value) which would comply with one or more naming schema. Proposed values may be generated in a number of ways, such as by selecting an unused value from a list of available values, creating a unique value by appending a serial number or random number to a pre-determined value, etc.

The user may select these proposed values or enter values of his or her choice using the mobile device (109), which are then received and checked (110) for compliance with the naming policy (107). If the user-selected values are compliant, then those values are used by the mobile device (109) to re-configure (108) the beacon's ID values (151) through the beacon's administrative protocol. If the user-selected values are not compliant with the naming policy (107), then a policy override resolution process (111) may be initiated.

Optionally, the naming policy or registry (107) may be updated to record the known location coordinates and the current ID values for the beacon.

Also optionally, the mobile device may enter a zone-edge finding mode in which the user moves the mobile device within the proximity to find and record location coordinates along the extremities of the range of the beacon, which can also be recorded into the naming policy or registry for later display on the administrator console and later administration of the physical locations of goods and services in the venue.

Subsequent to completing the ID value updates and optionally the edge-finding process, the mobile device returns to searching for another beacon (101, 102), or concurrently continues to search for additional beacons while configuring the current beacon (just in case the beacons' ranges overlap).

Secondary Embodiment. In another available embodiment according to the current invention, in order to establish a location within the venue, a variety of other means besides or in addition to Wi-Fi triangulation may be engaged.

A camera on the mobile device can be used to capture an electronic image of the immediate surroundings and, through image and optical character recognition, the approximate location could be determine. For example, the image might contain a structural pole with a number or identifier on it, or it might contain a sign with a department name on it (Women's Clothing or Emergency Room, etc.).

Alternatively or in conjunction with other location determination technologies, a user may start from a known point (e.g., a datum) in the venue and move towards the beacon to be configured, during which the mobile device uses inertial navigation from the start point to the point where the proximity beacon is encountered. Inertial navigation can be performed using the accelerometer (e.g., motion sensor) contained within the mobile device or added to the mobile device.

These location determination mechanisms can be used individually or in combination with each other and/or the triangulation process.

Hardware Product Embodiments. Embodiments according to the present invention may be realized in part or whole through electronic hardware circuitry, such as microprocessor-based circuitry, microcontroller-based circuitry, programmable logic arrays, custom circuits, and combinations thereof.

Figure 6:
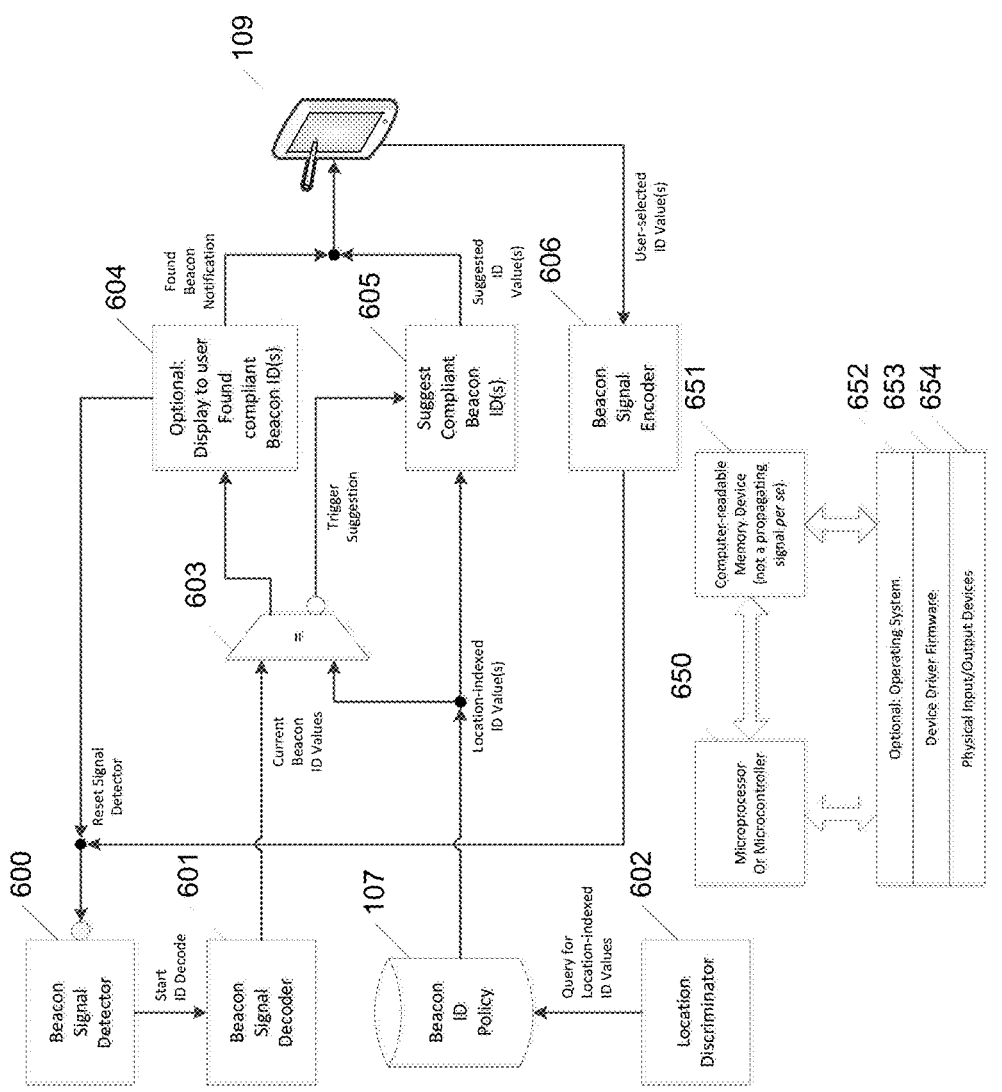
FIG. 6 illustrates an exemplary embodiment according to the present invention which is realized in part or whole through electronic hardware circuitry, such as microprocessor-based circuitry, microcontroller-based circuitry, programmable logic arrays, custom circuits, and combinations thereof.

FIG. 6 illustrates one such hardware-based embodiment, in which a beacon signal detector (600) triggers an ID value decoder (601). The decoded ID value of the encountered beacon is compared using a comparator (603) with a standardized or policy (107) compliant value set based on the output of a location discriminator (602). If the comparison is true, then optionally an output formatter (604) creates a notification to the user on an output user interface of the mobile device (106). If the comparison is not true, then a suggestion formatter (605) creates a suggested value (or value set) which would be compliant, and notifies the user via the output user interface of the mobile device (106).

If the user selects a suggested value or inputs another value via the input user interface of the mobile device (106), these values then used by an encoder (606) to create the appropriate commands to transmit to the beacon to change its ID values. Following which the circuit resets the detector to look for another beacon's signal.

A portion of this logic may be implemented through the sequential operations of a microprocessor or microcontroller (650) executing program instructions stored in a computer-readable memory device which is not a propagating signal per se. In some embodiments, the processor may be supplied with an operating system and/or device drivers which assist in the interoperations with physical (hardware) I/O devices such as, but not limited to, data network interface, user interface devices, power supplies, and mass storage devices.

Computer Program Product Embodiments. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for improving administration and consistency of proximity beacon naming within a venue, comprising:
   responsive to encountering a plurality of wireless proximity beacons while being operated in a venue, determining, by a mobile computing device, an actual location of the mobile computing device within the venue by using wireless signal triangulation;
   for at least one of the wireless proximity beacons:
      receiving, by the mobile computing device, from the wireless proximity beacon, a unique identifier, a major number, and a minor number from the wireless proximity beacon;
      extracting, by the mobile computing device, from the major number an indication of a wireless proximity beacon site location, and from the minor number an indication of at least one sub-location within the site location selected from the group consisting of a floor location and a zone location;
      verifying, by the mobile computing device, that the extracted site location and sub-location match one or more corresponding actual wireless proximity beacon locations selected from a site, a floor and a zone, according to the beacon name coding policy; and
      responsive to the verification finding a mismatch, sending, via wireless communications, by the mobile computing device, to the wireless proximity beacon, an administrative command to change the wireless proximity beacon's major number, minor number, or both, to match the wireless proximity beacon's actual location according to the beacon name coding policy, thereby leaving the unique identifier of the wireless proximity beacon unchanged while providing two levels of location precision including a site value and a sub-location value within the site value.

2. The method as set forth in claim 1 further comprising, subsequent to the receiving the unique identifier, a major number, and a minor number, and prior to sending the administrative command:
   notifying a user of the mobile computing device via a user interface of one or more of the major number, and the minor number;
   proposing by the mobile computing device to the user via the user interface one or more changes to the one or more major number and the minor number according to the beacon name coding policy; and
   receiving, by the mobile computing device, one or more user-selected changes from the user interface;
   wherein the sending the administrative command further includes the user-selected changes.

3. The method as set forth in claim 1 further comprising, subsequent to the receiving the unique identifier, a major number, and a minor number, and prior to sending the administrative command, communicating by the mobile computing device with a naming server, wherein the updating includes at least one change communicated from the naming server.

4. The method as set forth in claim 1 wherein the proximity beacons comprise at least one Bluetooth Low Energy beacon.

5. A system for improving administration and consistency of proximity beacon naming within a venue, comprising:
   a mobile computing device having a processor;
   a computer-readable, tangible storage memory accessible by the processor; and
   one or more program instructions encoded by the computer-readable, tangible storage memory for causing the processor to, when executed:
      responsive to encountering a plurality of wireless proximity beacons while being operated in a venue, determine, by a mobile computing device, an actual location of the mobile computing device within the venue by using wireless signal triangulation;
      for at least one of the wireless proximity beacons:
         receive, by the mobile computing device, from the wireless proximity beacon, a unique identifier, a major number, and a minor number from the wireless proximity beacon;
         extract, by the mobile computing device, from the major number an indication of a wireless proximity beacon site location, and from the minor number an indication of at least one sub-location within the site location selected from the group consisting of a floor location and a zone location;
         verify, by the mobile computing device, that the extracted site location and sub-location match one or more corresponding actual wireless proximity beacon locations selected from a site, a floor and a zone, according to the beacon name coding policy; and responsive to the verification finding a mismatch, send via wireless communications, by the mobile computing device, to the wireless proximity beacon, an administrative command to change the wireless proximity beacon's major number, minor number, or both, to match the wireless proximity beacon's actual location according to the beacon name coding policy, thereby leaving the unique identifier of the wireless proximity beacon unchanged while providing two levels of location precision including a site value and a sub-location value within the site value.

6. The system as set forth in claim 5 wherein the program instructions further comprise instructions for, subsequent to the receiving the unique identifier, a major number, and a minor number, and prior to sending the administrative command:
notify a user of the mobile computing device via a user interface of one or more of the major number, and the minor number;
propose by the mobile computing device to the user via the user interface one or more changes to the one or more major number and the minor number according to the beacon name coding policy; and
receive one or more user-selected changes from the user interface;
wherein the sending the administrative command further includes the user-selected changes.

7. The system as set forth in claim 5 wherein the program instructions further comprise instructions for, subsequent to the receiving the unique identifier, a major number, and a minor number, and prior to sending the administrative command, communicating by the mobile computing device with a naming server, wherein the updating includes at least one change communicated from the naming server.

8. The system as set forth in claim 5 wherein the proximity beacons comprise at least one Bluetooth Low Energy beacon.

9. A computer program product for improving administration and consistency of proximity beacon naming within a venue, comprising:
a computer-readable, tangible storage memory accessible by a processor of a mobile computing device which is not a propagating signal per se; and
one or more program instructions encoded by the computer-readable, tangible storage memory for causing the processor to, when executed:
responsive to encountering a plurality of wireless proximity beacons while being operated in a venue, determine, by a mobile computing device, an actual location of the mobile computing device within the venue by using wireless signal triangulation;
for at least one of the wireless proximity beacons:
receive, by the mobile computing device, from the wireless proximity beacon, a unique identifier, a major number, and a minor number from the wireless proximity beacon;
extract, by the mobile computing device, from the major number an indication of a wireless proximity beacon site location, and from the minor number an indication of at least one sub-location within the site location selected from the group consisting of a floor location and a zone location;
verify, by the mobile computing device, that the extracted site location and sub-location match one or more corresponding actual wireless proximity beacon locations selected from a site, a floor and a zone, according to the beacon name coding policy; and
responsive to the verification finding a mismatch, send via wireless communications, by the mobile computing device, to the wireless proximity beacon, an administrative command to change the wireless proximity beacon's major number, minor number, or both, to match the wireless proximity beacon's actual location according to the beacon name coding policy, thereby leaving the unique identifier of the wireless proximity beacon unchanged while providing two levels of location precision including a site value and a sub-location value within the site value.

10. The computer program product as set forth in claim 9 wherein the program instructions further comprise instructions for, subsequent to the receiving the unique identifier, a major number, and a minor number, and prior to sending the administrative command:
notify a user of the mobile computing device via a user interface of one or more of the major number, and the minor number;
propose by the mobile computing device to the user via the user interface one or more changes to the one or more major number and the minor number according to the beacon name coding policy; and
receive one or more user-selected changes from the user interface;
wherein the sending the administrative command further includes the user-selected changes.

11. The computer program product as set forth in claim 9 wherein the program instructions further comprise instructions for, subsequent to the receiving the unique identifier, a major number, and a minor number, and prior to sending the administrative command, communicating by the mobile computing device with a naming server, wherein the updating includes at least one change communicated from the naming server.

12. The computer program product as set forth in claim 9 wherein the proximity beacons comprise at least one Bluetooth Low Energy beacon.

* * * * *